(12) United States Patent
Jung

(10) Patent No.: US 6,362,740 B1
(45) Date of Patent: Mar. 26, 2002

(54) APPARATUS FOR PROVIDING THERMAL ALERT SIGNAL AND CONTROL METHOD THEREOF IN SKIN-CONTACT TYPE TERMINAL

(75) Inventor: Chae-Sung Jung, Seoul (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/709,825

(22) Filed: Nov. 10, 2000

(30) Foreign Application Priority Data

Nov. 11, 1999 (KR) .......................................... 99-49872

(51) Int. Cl.⁷ .............................................. G08B 17/00
(52) U.S. Cl. ................. 340/584; 340/573.1; 340/573.4; 607/104; 607/105
(58) Field of Search .......................... 340/573.1, 573.4, 340/575, 576, 10.41, 10.5, 584, 588, 589; 600/345, 347; 607/101, 104, 105, 113; 62/3.5, 259.3

(56) References Cited

U.S. PATENT DOCUMENTS 5,562,604 A * 10/1996 Yablon et al. ............... 601/148
6,081,749 A * 6/2000 Ingle et al. .................. 607/101
6,123,702 A * 9/2000 Swanson et al. ............... 606/34
6,125,636 A * 10/2000 Taylor et al. .................. 62/3.5
6,139,569 A * 10/2000 Ingle et al. .................. 607/104

* cited by examiner

Primary Examiner—V. Trieu
(74) Attorney, Agent, or Firm—Steve Cha; Klauber & Jackson

(57) ABSTRACT

A skin-contact type terminal system includes a thermoelectric module for cooling or heating in accordance with a polarity of current provided from the skin-contact type terminal, with the temperature of cooling or heating being adjusted according to a level of a voltage provided thereto, and being controlled to maintain its cooling or heating operation for a predetermined time. A control unit senses generation of an alert request signal, supplies the voltage to the thermoelectric module in accordance with the sensed alert request signal so that the thermoelectric module cools or heats in accordance with the predetermined cooling or heating temperature. The control unit controls the thermoelectric module to maintain its cooling or heating operation for the predetermined time.

20 Claims, 7 Drawing Sheets

APPARATUS FOR PROVIDING THERMAL ALERT SIGNAL AND CONTROL METHOD THEREOF IN SKIN-CONTACT TYPE TERMINAL

CLAIM OF PRIORITY

This application makes reference to and claims all benefits accruing under 35 U.S.C. Section 119 from an application entitled, "APPARATUS FOR PROVIDING THERMAL ALERT SIGNAL AND CONTROL METHOD THEREOF IN SKIN-CONTACT TYPE TERMINAL", filed in the Korean Industrial Property Office on Nov. 11, 1999 and there duly assigned Serial No. 99-49872.

BACKGROUND OF THE INVENTION

1. Field of the Invention

The present invention relates to a skin-contact type terminal system. More particularly, the present invention relates to an apparatus for providing a thermal alert signal according to an alert request and a control method thereof in a skin-contact-type terminal.

2. Description of the Related Art

With the development of modem society, terminals such as portable telephones terminals, various kinds of PDAs, etc., have been become increasingly popular. Some types of terminals, such as the portable telephone terminal, generate a plurality of alert signals including a terminating signal, an alarm signal, etc.

As one of such alert signals known in the prior art, a visual alert signal utilizing light is provided. However, this visual alert signal has a problem that it can be confirmed only when the terminal is within the terminal user's view.

Second, a sound alert signal utilizing sound is provided. This sound alert signal has a problem in that it may cause unwanted noise, especially in a public place or a conference room where silence is preferred.

Third, in order to solve such a noise problem, a vibration alert signal utilizing vibration is provided. However, this vibration alert signal has problems in that miniaturization of the terminal becomes difficult due to the equipment of a vibrating device for mechanical vibration in the terminal, and the vibration gives the user an unpleasant feeling.

SUMMARY OF THE INVENTION

Accordingly, the present invention has been made in an effort to solve the problems occurring in the related art, and an object of the present invention is to provide an apparatus for providing a thermal alert signal and a control method thereof in a skin-contact type terminal system.

In order to achieve the above object, according to the present invention, there is provided an apparatus for providing a thermal alert signal in a skin-contact type terminal, comprising: a thermoelectric module for cooling down or heating in accordance with a polarity of current provided thereto, with the cooling or heating temperature adjusted according to a level of a voltage provided thereto, the thermoelectric module being controlled to maintain its cooling or heating operation for a predetermined time; and a control unit for sensing generation of an alert request signal, supplying the voltage to the thermoelectric module in accordance with the sensed alert request signal so that the thermoelectric module cools or heats in accordance with the predetermined cooling or heating temperature, and controlling the thermoelectric module to maintain its cooling or heating operation for the predetermined time.

In another aspect of the present invention, there is provided a method of controlling a thermal alert signal providing apparatus in a skin-contact type terminal having a thermoelectric module which generates a thermal alert signal and in which a π-type serial circuit is constructed by connecting in junction each one end of a P-type semiconductor and an N-type semiconductor to an upper metal electrode and by connecting in junction the other end of the P-type semiconductor and the other end of the N-type semiconductor to lower metal electrodes, respectively, an anode is connected to the lower metal electrode connected to the P-type semiconductor, and a cathode is connected to the lower metal electrode connected to the N-type electrode, the method comprising the steps of: setting the thermal alert signal as an alert signal; detecting generation of an alert request in the skin-contact type terminal after the setting of the thermal alert signal as the alert signal; and generating the thermal alert signal as the alert signal if the generation of the alert request is detected.

In yet another aspect of the invention, a method for controlling a thermal alert signal includes providing the skin-contact type terminal with heat having a predetermined temperature for contact with a user's skin to alert the user.

The above method may include providing the skin-contact type terminal with cooling having a predetermined temperature for contact with the user's skin to alert the user.

The generating of the thermal alert signal may include one of a heating effect and a cooling effect, wherein the heating effect includes providing heat having a predetermined temperature for contact with a user's skin to alert the user, and the cooling effect includes providing the skin-contact type terminal with cooling having a predetermined temperature for contact with the user's skin to alert the user.

Finally, if the thermal alert signal is a heating alert signal, the method may include applying a DC voltage to the -type serial circuit so that current flows reversibly from the cathode to the anode, in accordance with the thermal alert signal, so that the heating effect is generated at the upper metal electrode; and if the thermal alert is a cooling alert signal, the method may include applying a DC voltage to the -type serial circuit so that current flows forwardly from the anode to the cathode, in accordance with the thermal alert signal, so that the cooling effect is generated at the upper metal electrode.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE PREFERRED EMBODIMENTS

Reference will now be made in greater detail to the preferred embodiments of the present invention with reference to the accompanying drawings. For the purpose of clarity, only the portions for understanding the operation of the present invention are explained and explanation of other portions will be omitted when it may make the subject matter of the present invention rather unclear.

Figure 1:
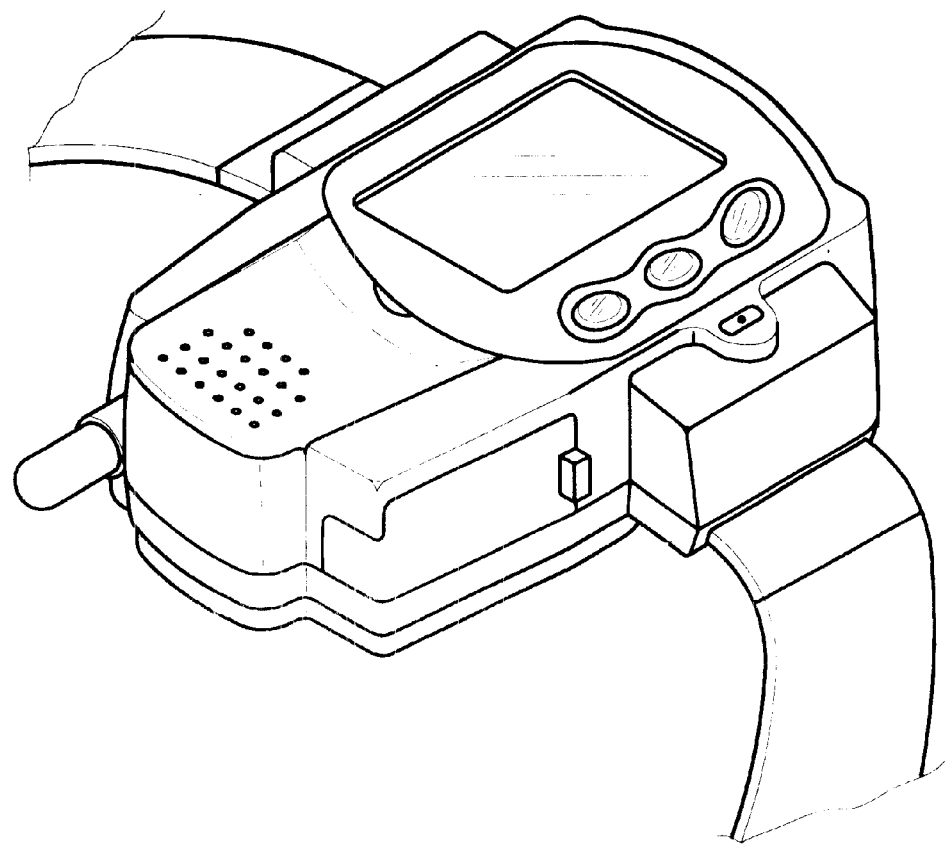
FIG. 1 is a perspective view illustrating an example of a skin-contact type terminal for performing the function according to an embodiment of the present invention.

FIG. 1 is a perspective view illustrating an example of a skin-contact type terminal for performing the function according to an embodiment of the present invention.

Figure 2:
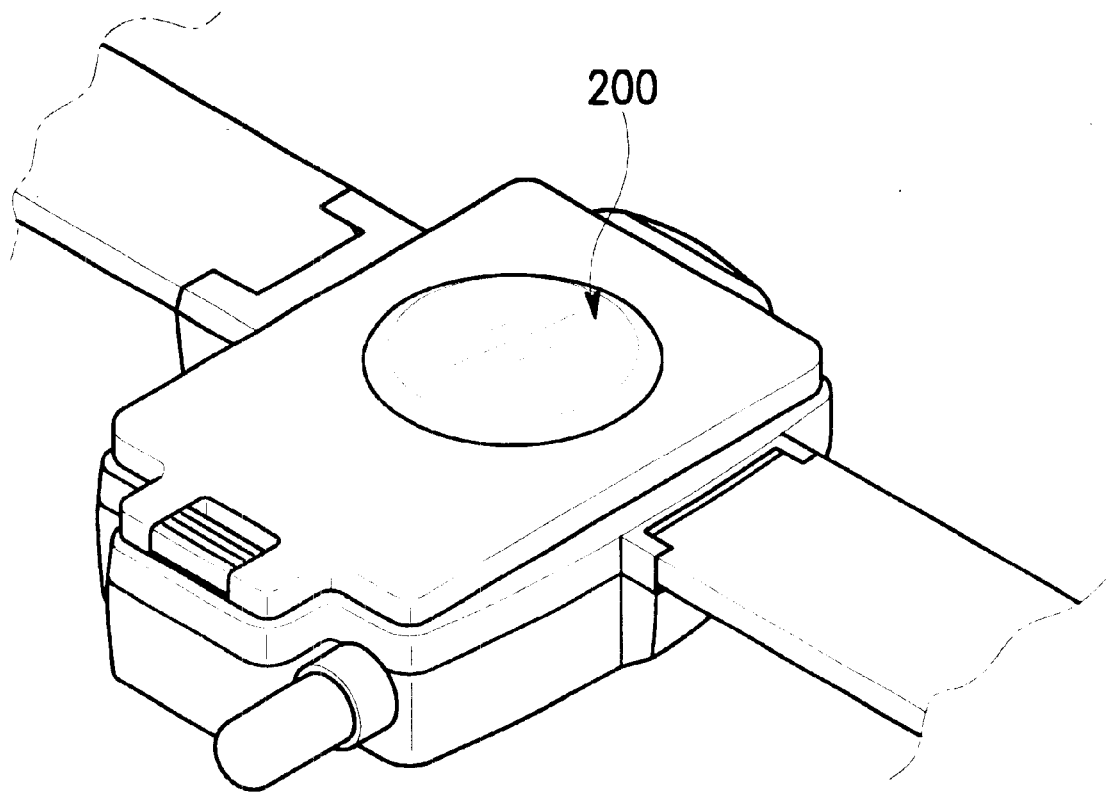
FIG. 2 is a perspective view illustrating the rear of the skin-contact type terminal of FIG. 1.

FIG. 2 is a perspective view illustrating the rear of the skin-contact type terminal of FIG. 1. The skin-contact type terminal is secured around the wrist and the rear side is in contact with the user's wrist.

With reference to FIG. 2, a thermoelectric module for generating a thermal alert signal is attached to a proper position 200 of the rear surface of the skin-contact type terminal, so that a user can sense the thermal alert signal.

Figure 3:
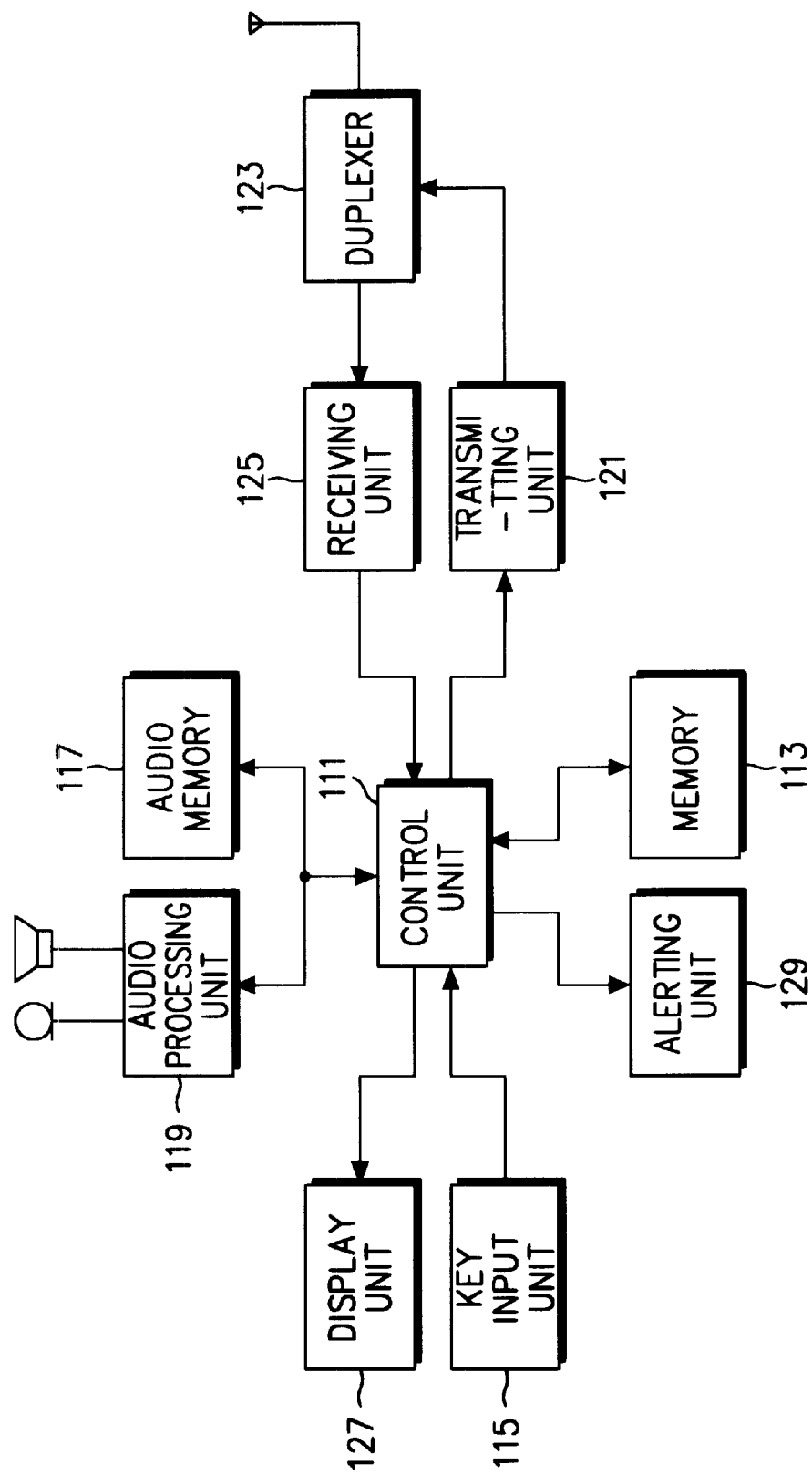
FIG. 3 is a block diagram illustrating the internal construction of the skin-contact type terminal for performing the function according to an embodiment of the present invention.

FIG. 3 is a block diagram illustrating the internal construction of the skin-contact type terminal for performing the function according to an embodiment of the present invention.

A control unit 111 controls the whole operation of the skin-contact type terminal. A memory 113 stores therein a control program of the skin-contact type terminal and control data produced according to the control operation of the control unit 111. Especially, in the embodiment of the present invention, the memory 113 also includes an alert signal setting region for storing an alert signal generated in the skin-contact type terminal. The stored alert signal may be a sound alert signal, a vibration alert signal, and a thermal alert signal.

A key input unit 115 is provided with a plurality of dialing digit keys, a menu key, a send key, etc., and generates and transfers to the control unit 111 a key signal corresponding to a key selected by a user.

An audio memory 117 stores therein a plurality of audio messages. An audio processing unit 119 analog-processes the audio message read out from the audio memory 117 under the control of the control unit 111 to output the analog-processed audio message through a speaker, and digital-processes an analog audio signal inputted through a microphone by the user.

A transmitting unit 121 receives a signal generated from the control unit 111, modulates the input signal to a digital radio signal, and transfers the radio signal to a duplexer 123. The duplexer 123 transmits the radio signal transferred from the transmitting unit 121 through an antenna, and transfers a radio signal received through the antenna to a receiving unit 125. The receiving unit 125 demodulates the radio signal transferred from the duplexer 123, and transfers the demodulated signal to the control unit 111. The control unit 111 controls a telephone call according to the transferred signal.

A display unit 127 comprises by a liquid crystal display (LCD) unit and light-emitting diodes (LEDs), and displays the control data of the telephone terminal and input data under the control of the control unit 111.

An alerting unit 129 is provided with a buzzer, a vibrating motor, a thermoelectric module, etc. If an alert request signal is produced under the control of the control unit 111, for example, if the alert request signal is produced in response to a call message received from an opposite party for the telephone call, the alerting unit 129 generates a predetermined type alert signal such as a visual alert signal, a sound alert signal, or a thermal alert signal.

Figure 4:
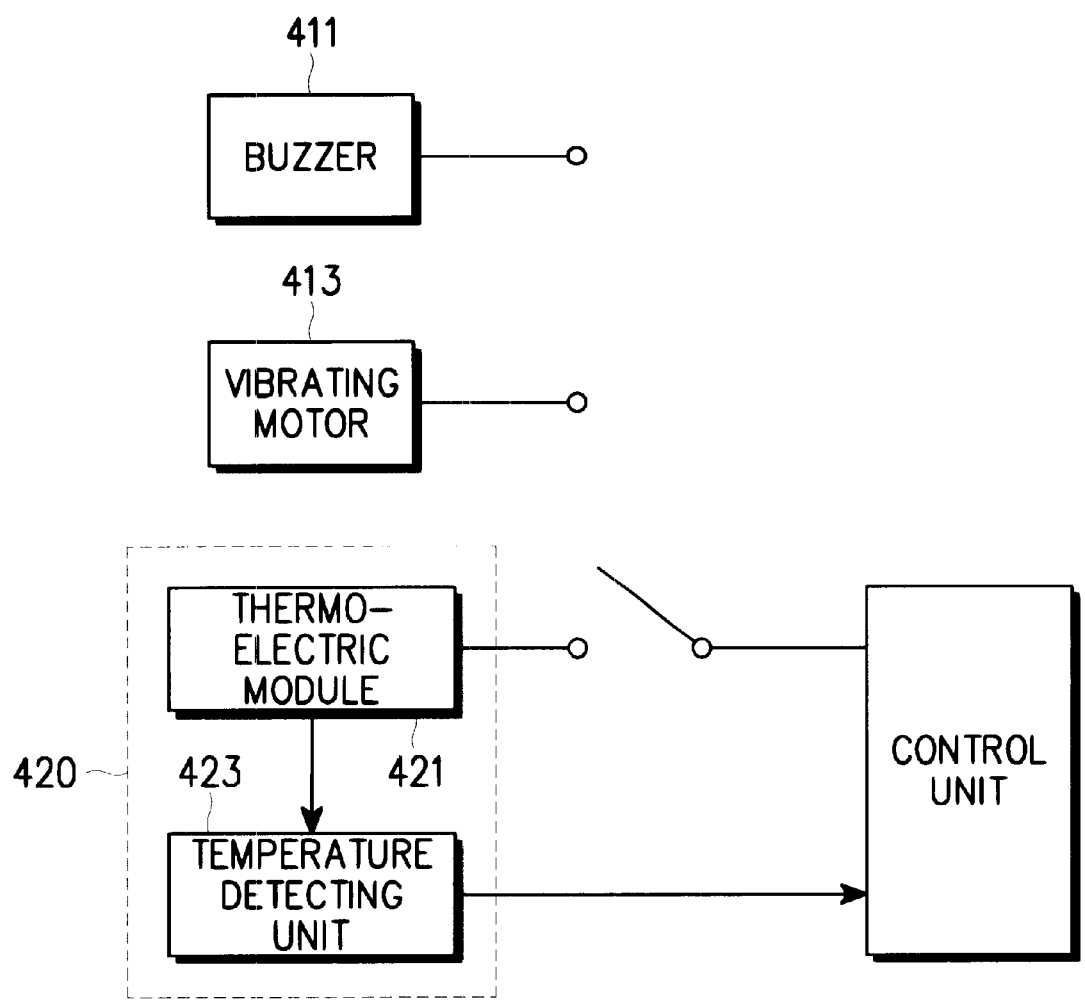
FIG. 4 is a block diagram illustrating in detail the internal construction of an alerting unit of FIG. 3.

FIG. 4 is a block diagram illustrating in detail the internal construction of an alerting unit 129 shown in FIG. 3.

With reference to FIG. 4, a buzzer 411 generates the sound alert signal under the control of the control unit 111, and a vibrating motor 413 generates the vibration alert signal. A thermal alert signal generating unit 420 is composed of a thermoelectric module 421 and a temperature detecting unit 423, and generates the thermal alert signal under the control of the control unit 111. Here, the thermoelectric module 421 is implemented by integration of a thermoelectric semiconductor, and generates a heating and cooling alert signal using the Peltier effect of the thermoelectric semiconductor. The temperature detecting unit 423 detects the temperature of the thermal alert signal generated from the thermoelectric module 421 and the ambient temperature.

Figure 5:
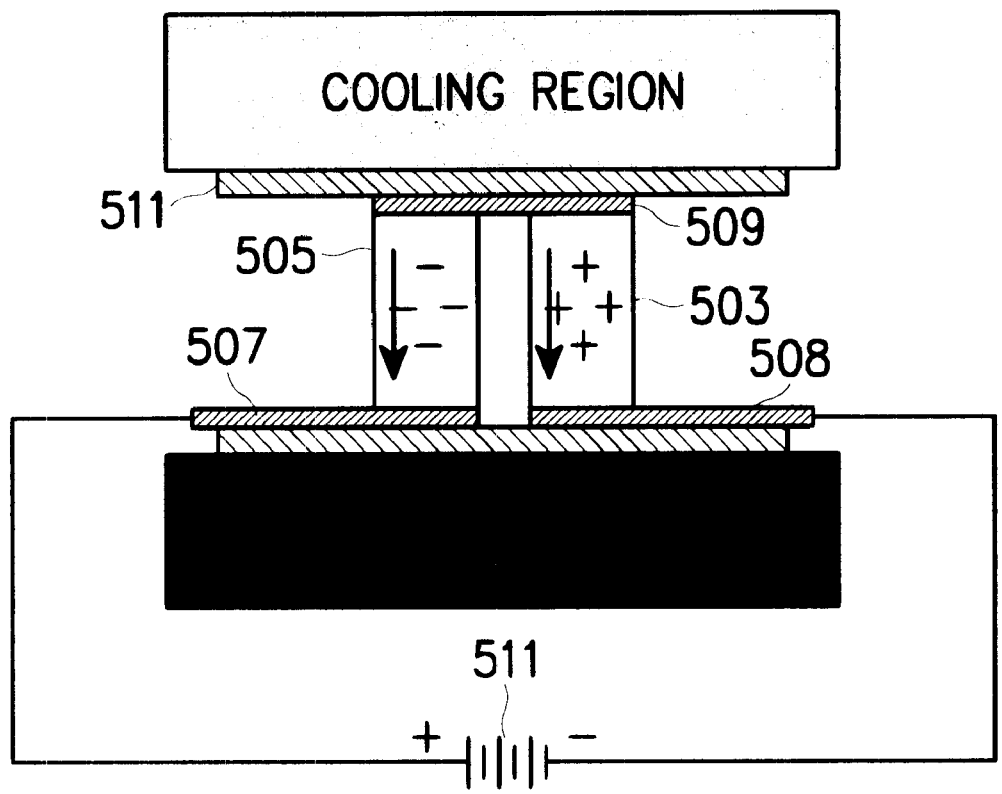
FIG. 5 is a view illustrating the structure of a thermoelectric module of FIG. 4.

FIG. 5 is a view illustrating the structure of a thermoelectric module 421 shown in FIG. 4. In particular, the internal construction of the thermoelectric semiconductor is shown in FIG. 5.

With reference to FIG. 5, one end of a P-type semiconductor 503 and one end of an N-type semiconductor 505 are connected in junction to a lower metal electrode 507 and to another lower electrode 508, respectively, and the other end of the P-type semiconductor 503 and the other end of the N-type semiconductor 505 are connected in junction to an upper metal electrode 509 to construct a -type serial circuit. This -type serial circuit is connected to a DC voltage source 511, and when current is supplied thereto, holes in the P-type semiconductor 503 are guided to the cathode while electrons in the N-type semiconductor 505 are guided to the anode. At this time, all the holes and electrons take heat from the upper metal electrode 509, and move to the lower metal electrodes 507 and 508, respectively, resulting in that the upper metal electrode 509 absorbs heat and the lower metal electrodes 507 and 508 discharge heat. Accordingly, it is possible for the upper metal electrode 509, which is attached to the proper position 200 of the rear surface of the skin-contact type terminal as shown in FIG. 2, to generate a cooling alert signal.

Meanwhile, if the current of the DC voltage source 511 is supplied to the electrodes in an opposite manner to the above-described case, the holes in the P-type semiconductor 503 move to the upper metal electrode 509 by an extracting force from the anode, and the electrons in the N-type semiconductor 505 move to the upper metal electrode 509 by an extracting force from the cathode. At this time, all the holes and electrons take heat from the lower metal electrodes 507 and 508, and move to the upper metal electrode 509, resulting in that the upper metal electrode 509 discharges heat and the lower metal electrodes 507 and 508 absorb heat. Accordingly, it is possible for the upper metal electrode 509 to generate a heating alert signal.

In the embodiment of the present invention, the current of the voltage source is supplied based on the case that the cooling alert signal is generated. In the case of providing the heating alert signal, the current of the voltage source is supplied in the opposite direction to the case that the cooling alert signal is generated.

Figure 6:
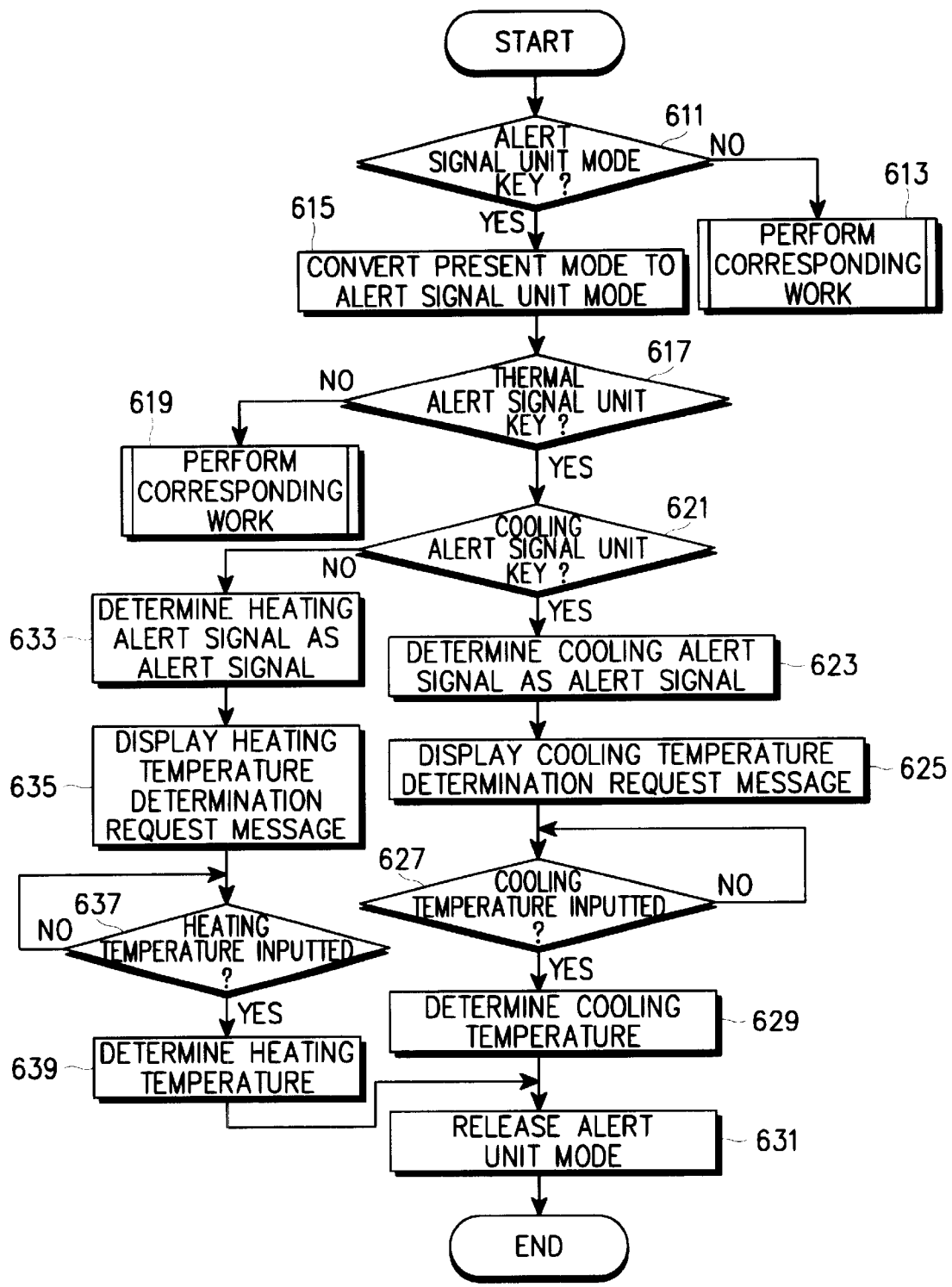
FIG. 6 is a flowchart illustrating the alert signal setting process according to an embodiment of the present invention.

FIG. 6 is a flowchart illustrating the alert signal setting process according to an embodiment of the present invention.

First, at step 611, if a key signal is inputted from the key input unit 115, the control unit 111 checks whether or not the input key signal is an alert signal selection mode key signal. At this time, the alert signal selection mode key signal is set by combining a plurality of keys provided in the key input unit 115. If it is determined at step 611 that the input key signal is not the alert signal selection mode key signal, the control unit 111 then proceeds to step 613. At step 613, the control unit 111 performs a function corresponding to the input key signal, and returns to normal operations.

If the input key signal is the alert signal selection mode key signal, the control unit 111 then proceeds to step 615. At step 615, the control unit 111 converts the present mode of the skin-contact type terminal into an alert signal selection mode, and proceeds to step 617. At step 617, the control unit 111 checks whether or not a thermal alert signal selection key signal is inputted from the key input unit 115. Here, the thermal alert signal selection key signal is set by combining keys provided in the key input unit 115. If it is determined at step 617 that the input key signal is not the thermal alert signal selection key signal, the control unit then proceeds to step 619. At step 619, the control unit 111 performs a function corresponding to the key signal inputted from the key input unit 115, and returns. Here, as key signals other than the thermal alert signal selection key signal, a vibration alert signal selection key signal and a sound alert signal selection key signal are provided. If the vibration alert signal selection key signal is provided, a corresponding function for setting the vibration alert signal as the alert signal is performed, while if the sound alert signal selection key signal is provided, a corresponding function for setting the sound alert signal as the alert signal is performed.

At step 617, if it is determined that the thermal alert signal selection key signal is inputted, the control unit 111 then proceeds to step 621. At step 621, the control unit 111 checks whether or not the key signal inputted from the key input unit 115 is the cooling alert signal selection key signal. If the input key signal is the cooling alert signal selection key s signal, the control unit then proceeds to step 623. At step 623, the control unit 111 sets the cooling alert signal as the alert signal in the alert signal setting region of the memory 113, and proceeds to step 625. At step 625, the control unit 111 reads out from the memory 113 a pre-stored cooling temperature setting request message, for instance, a message "Input the cooling temperature.", displays the message on the display unit 127, and then proceeds to step 627. At step 627, the control unit 111 receives from the key input unit 115 the key signal corresponding to the cooling temperature inputted by the user, and proceeds to step 629. At step 629, the control unit 111 sets the cooling temperature in the alert signal setting region, and then proceeds to step 631. At step 631, the control unit 111 releases the alert signal selection mode, and returns to normal operation.

Meanwhile, if it is determined at step 621 that the key signal inputted from the key input unit 115 is not the cooling alert signal selection key, but is the heating alert signal selection key signal, the control unit 111 then proceeds to step 633. At step 633, the control unit 111 sets the heating alert signal as the alert signal in the alert signal setting region of the memory 113, and then proceeds to step 635. At step 635, the control unit 111 reads out from the memory 113 a pre-stored heating temperature setting request message, for instance, a message "Input the heating temperature.", displays the message on the display unit 127, and then proceeds to step 637. At step 637, the control unit 111 receives from the key input unit 115 the key signal corresponding to the heating temperature inputted by the user, and then proceeds to step 639. At step 639, the control unit 111 sets the heating temperature in the alert signal setting region, and proceeds to step 631. At step 631, the control unit 111 releases the alert signal selection mode, and returns to normal operation.

Also, although not illustrated, it is possible for the user to set the time period where generation of the thermal alert signal, i.e., the cooling alert signal or the heating alert signal, is maintained, and thus the cooling alert signal or the heating alert signal is generated for the time period set by the user.

Accordingly, the alert signal setting process of FIG. 6 enables the setting of the cooling alert signal or the heating alert signal as the alert signal.

Figure 7:
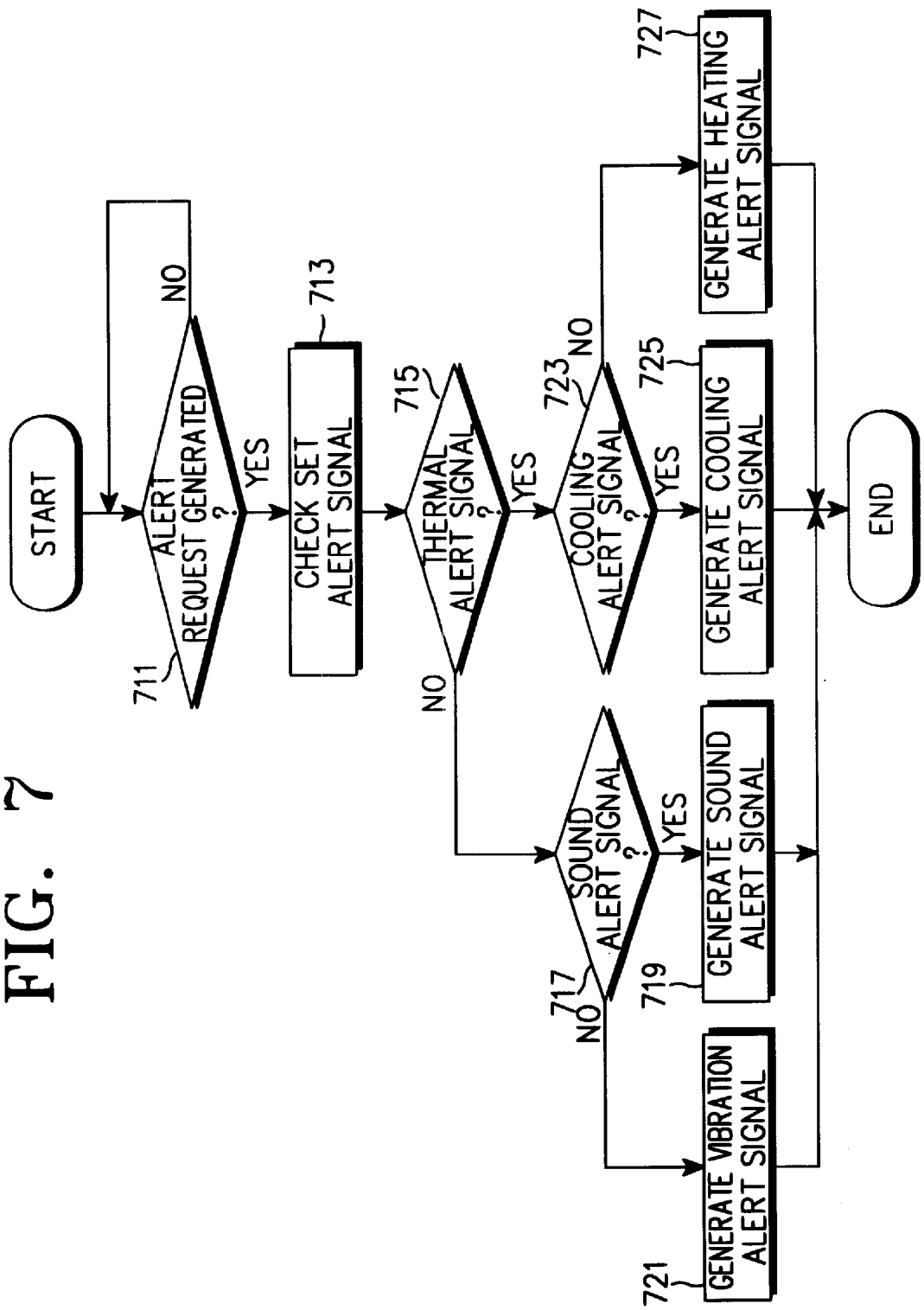
FIG. 7 is a flowchart illustrating the alert signal generating process according to an embodiment of the present invention.

FIG. 7 is a flowchart illustrating the alert signal generating process according to an embodiment of the present invention.

With reference to FIG. 7, the control unit 111 checks whether or not the alert request signal is generated at step 711. Here, the generation of the alert request signal means that a request for generating the alert signal is generated in the case of alerting the user to receipt of a call message according to a call request from an opposite party, arrival of an alarm time, or receipt of a character and audio message.

If it is determined at step 711 that the alert request signal is generated, the control unit 111 then proceeds to step 713. At step 713, the control unit 111 checks the set alert signal by reading the alert signal setting region of the memory 113, and then proceeds to step 715. At step 715, the control unit 111 checks whether or not the set alert signal is the thermal alert signal.

If it is determined that the set alert signal is not the thermal alert signal, the control unit 111 then proceeds to step 717. At step 717, the control unit 111 checks whether or not the set alert signal is the sound alert signal. If the set alert signal is determined to be the sound alert: signal, the control unit 111 then proceeds to step 719. At step 719, the control unit 111 drives the buzzer 411 to generate the sound alert signal, and returns to normal operation.

If it is determined at step 717 that the set alert signal is not the sound alert signal, the control unit 111 then proceeds to step 721. At step 721, the control unit 111 drives the vibrating motor 413 to generate the vibration alert signal, and returns.

Meanwhile, if it is determined at step 715 that the set alert signal is the thermal alert signal, the control unit 111 then proceeds to step 723. At step 723, the control unit 111 checks whether or not the set thermal alert signal is the cooling alert signal. If the set thermal alert signal is determined to be the cooling alert signal, the control unit 111 then proceeds to step 725.

At step 725, the control unit 111 provides the current of the DC voltage source 511 in a predetermined direction, i.e., as shown in FIG. 5, provides the current to the thermoelectric module by connecting the anode of the DC voltage source 511 to the lower metal electrode 507 connected to the N-type semiconductor 505 and by connecting the cathode of the voltage source 511 to the lower metal electrode 508 connected to the P-type semiconductor 503 so as to generate the cooling alert signal, and returns to normal operation. At this time, by adjusting the level of the voltage applied from the voltage source 511, it is possible to generate the cooling alert signal with its temperature maintained to be the same as the set cooling temperature.

Meanwhile, if it is determined at step 723 that the set thermal alert signal is not the cooling alert signal, the control unit 11 determines the thermal alert signal to be the heating alert signal, and then proceeds to step 727. At step 727, the control unit 111 determines the direction of the current to be opposite to that in the case of generating the cooling alert signal, and generates the heating alert signal. Specifically, the control unit 111 provides the current to the thermoelectric module by connecting the cathode of the DC voltage source 511 to the lower metal electrode 507 connected to the N-type semiconductor 505 and by connecting the anode of the voltage source 511 to the lower metal electrode 508 connected to the P-type semiconductor 503 so as to generate the heating alert signal, and returns. At this time, by adjusting the level of the voltage applied from the voltage source 511, it is possible to generate the heating alert signal with its temperature maintained to be the same as the set heating temperature.

As described above, the present invention enables the providing of the thermal alert signal in a skin-contact type terminal. Accordingly, it can solve the problem of the conventional visual alert signal that it can be confirmed only when the terminal is within the terminal user's view, the problem of the sound alert signal in that it causes a noise especially in a public place or a conference room where silence is required, and the problem of the vibration alert signal in that miniaturization of the terminal becomes difficult due to the equipment of a vibrating device for mechanical vibration in the terminal and the vibration gives the user an unpleasant feeling.

While this invention has been described in connection with what is presently considered to be the most practical and preferred embodiment, it is to be understood that other modifications thereof may be made without departing from the scope of the invention. Thus, the invention should not be limited to the disclosed embodiment, but should be defined by the scope of the appended claims and their equivalents.

What is claimed is:

1. An apparatus for providing a thermal alert signal in a skin-contact type terminal, comprising:
    a thermoelectric module means for one of a cooling and heating operation to generate a thermal alert signal in accordance with a polarity of current provided thereto, wherein a temperature of said cooling and heating is adjusted according to a level of a voltage and the direction of the polarity of current provided thereto, and the thermoelectric module being controlled to maintain said cooling and heating operation for a predetermined time; and
    a control unit means for sensing generation of an alert request signal and supplying said voltage to the thermoelectric module in accordance with the sensed alert request signal, so that the thermoelectric module cools and heats in accordance with the predetermined cooling and heating temperature, and said control unit means controls the thermoelectric module to maintain said one of cooling and heating operation for the predetermined time, so that the thermoelectric module means contact provides the one of said heating and cooling thermal alert signal to a skin of a user in contact with the skin-contact type terminal.

2. The apparatus as claimed in claim 1, wherein said thermoelectric module means comprises an integrated thermoelectric semiconductor.

3. The apparatus as claimed in claim 1, wherein the control unit means generates a one of a cooling alert signal for the cooling operation and a heating alert signal for the heating operation by providing a current to the thermoelectric module for the cooling alert signal having a predetermined polarity which is opposite a predetermined polarity of the heating alert signal.

4. A method of controlling a thermal alert signal providing apparatus in a skin-contact type terminal, comprising the steps of:
    (a) setting the thermal alert signal as an alert signal according to a user's request;
    (b) detecting a generation of an alert request in the skin-contact type terminal after the setting of the thermal alert signal as the alert signal; and
    (c) generating the thermal alert signal by changing the polarity of current applied to said apparatus as the alert signal to alert the user if the alert request recited in step (a) is detected.

5. The control method as claimed in claim 4, wherein the thermal alert signal setting step recited in step (a) includes the steps of:
    (1) converting a present mode of the skin-contact type terminal into an alert signal selection mode in accordance with an input of an alert signal selection mode key from a user;
    (2) receiving an input of the thermal alert signal as the alert signal in the alert signal selection mode;
    (3) selecting and receiving a cooling or heating alert signal as the thermal alert signal; and
    (4) receiving and setting a cooling temperature and a time period, during which the cooling alert signal is generated, if the input thermal alert signal is the cooling alert signal.

6. The control method as claimed in claim 5, further comprising the step of receiving and determining a heating temperature and a time period, during which the heating alert signal is generated, if the input thermal alert signal is the heating alert signal.

7. The control method as claimed in claim 6, wherein the thermal alert signal generating step comprises the steps of:
    (a) sensing generation of the alert request in the skin-contact type terminal;
    (b) checking a predetermined alert signal according to the generation of the alert request;
    (c) if the checked alert signal is the thermal alert signal, checking whether or not the thermal alert signal is the cooling alert signal; and
    (d) if the thermal alert signal is the cooling alert signal, generating the cooling alert signal with a predetermined cooling temperature for a predetermined time period.

8. The control method as claimed in claim 7, further comprising the step of, if the thermal alert signal is the heating alert signal, generating the heating alert signal with a predetermined heating temperature for a predetermined time period.

9. The control method according to claim 4, wherein the generating thermal alert signal includes providing the skin-contact type terminal with heat having a predetermined temperature for contact with a user's skin to alert the user.

10. A method of controlling a thermal alert signal providing apparatus in a skin-contact type terminal, comprising the steps of:
    (a) switching a mode of the skin-contact type terminal to an alert signal selection mode in response to an alert signal selection mode key inputted from a user;
    (b) receiving a thermal alert signal selection key in the alert signal selection mode;
    (c) receiving a cooling alert signal selection key or a heating alert signal selection key after the reception of the thermal alert signal selection key, thereby selecting a type of the thermal alert signal;

(d) receiving keys of a predetermined temperature and a predetermined time period for generating the thermal alert signal after the selection of the type of the thermal alert signal, and setting the thermal alert signal as an alert signal based on the received keys;

(e) sensing generation of an alert request after the setting of the thermal alert signal; and (f) generating the thermal alert signal, set as the alert signal, by changing the polarity of current applied to said apparatus when the generation of the alert request is sensed.

11. The control method as claimed in claim 10, wherein the cooling alert signal is generated if the set thermal alert signal is the cooling alert signal, while the heating alert signal is generated if the set thermal alert signal is the heating alert signal.

12. The control method according to claim 11, wherein the generating of the thermal alert signal includes providing the skin-contact type terminal with heat having a predetermined temperature for contact with a user's skin to alert the user, and generating the cooling alert signal includes providing the skin-contact type terminal with cooling having a predetermined temperature for contact with the user's skin to alert the user.

13. The control method as claimed in claim 10, wherein the thermal alert signal is generated with the predetermined temperature for the predetermined time period.

14. A method of controlling a thermal alert signal providing apparatus in a skin-contact type terminal having a thermoelectric module which generates a thermal alert signal and in which a -type serial circuit is constructed by connecting in junction each one end of a P-type semiconductor and an N-type semiconductor to an upper metal electrode and by connecting in junction the other end of the P-type semiconductor and the other end of the N-type semiconductor to lower metal electrodes, respectively, an anode is connected to the lower metal electrode connected to the P-type semiconductor, and a cathode is connected to the lower metal electrode connected to the N-type electrode, the method comprising the steps of;

(a) setting the thermal alert signal as an alert signal;

(b) detecting generation of an alert request in the skin-contact type terminal after the setting of the thermal alert signal as the alert signal; and (c) generating the thermal alert signal as the alert signal if the generation of the alert request is detected.

15. The control method as claimed in claim 14, wherein if the thermal alert signal is a cooling alert signal, a DC voltage is applied to the -type serial circuit so that current flows forwardly from the anode to the cathode, in accordance with the thermal alert signal, so that a cooling effect is generated at the upper metal electrode.

16. The control method as claimed in claim 15, wherein the DC voltage is controlled in level to control the cooling effect generated at the upper metal electrode, thereby adjusting a cooling temperature of the upper metal electrode.

17. The control method as claimed in claim 14, wherein if the thermal alert signal is a heating alert signal, a DC voltage is applied to the -type serial circuit in such a fashion that current flows reversely from the cathode to the anode, in accordance with the thermal alert signal, so that a heating effect is generated at the upper metal electrode.

18. The control method as claimed in claim 15, wherein the DC voltage is controlled in level to control the heating effect generated at the upper metal electrode, thereby adjusting a heating temperature of the upper metal electrode.

19. The control method according to claim 14, wherein the generating of the thermal alert signal includes one of a heating effect and a cooling effect, wherein the heating effect includes providing heat having a predetermined temperature for contact with a user's skin to alert the user, and the cooling effect includes providing the skin-contact type terminal with cooling having a predetermined temperature for contact with the user's skin to alert the user.

20. The control method according to claim 19, wherein if the thermal alert signal is a heating alert signal, said method includes applying a DC voltage is applied to the -type serial circuit in such a fashion that current flows reversely from the cathode to the anode, in accordance with the thermal alert signal, so that the heating effect is generated at the upper metal electrode; and if the thermal alert is a cooling alert signal, said method includes applying a DC voltage to the -type serial circuit so that current flows forwardly from the anode to the cathode, in accordance with the thermal alert signal, so that the cooling effect is generated at the upper metal electrode.

* * * * *